United States Patent
Zhang et al.

(10) Patent No.: US 10,454,623 B2
(45) Date of Patent: Oct. 22, 2019

(54) UPLINK RESOURCE COLLISION REDUCTION IN FD-MIMO

(71) Applicant: Intel IP Corporation, Santa Clara, CA (US)

(72) Inventors: Yushu Zhang, Beijing (CN); Yuan Zhu, Beijing (CN); Gang Xiong, Beaverton, OR (US); Jong-Kae Fwu, Sunnyvale, CA (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/572,994

(22) PCT Filed: Dec. 14, 2015

(86) PCT No.: PCT/US2015/065522
§ 371 (c)(1),
(2) Date: Nov. 9, 2017

(87) PCT Pub. No.: WO2016/204807
PCT Pub. Date: Dec. 22, 2016

(65) Prior Publication Data
US 2018/0145794 A1    May 24, 2018

Related U.S. Application Data

(60) Provisional application No. 62/181,652, filed on Jun. 18, 2015.

(51) Int. Cl.
*H04L 1/16*    (2006.01)
*H04L 1/18*    (2006.01)
(Continued)

(52) U.S. Cl.
CPC .......... *H04L 1/1678* (2013.01); *H04L 1/1657* (2013.01); *H04L 1/1671* (2013.01);
(Continued)

(58) Field of Classification Search
CPC .... H04L 5/0053; H04L 1/1812; H04L 5/0055
See application file for complete search history.

(56) References Cited

U.S. PATENT DOCUMENTS 10,090,986 B2 * 10/2018 Kim ...................... H04L 12/189
2009/0175233 A1   7/2009 Ojala et al.
(Continued)

FOREIGN PATENT DOCUMENTS

| WO | WO-2013066091 A1 | 5/2013 |
| WO | WO-2015034311 A1 | 3/2015 |
| WO | WO-2016204807 A1 | 12/2016 |

OTHER PUBLICATIONS

"International Application Serial No. PCT/US2015/065522, International Search Report dated Apr. 29, 2016", 3 pgs.
(Continued)

*Primary Examiner* — Chandrahas B Patel
(74) *Attorney, Agent, or Firm* — Schwegman Lundberg & Woessner, P.A.

(57) ABSTRACT

Disclosed herein are apparatuses, systems, and methods using or implementing full-dimension multi-input multi-output (FD-MIMO) and providing collision reduction by transmitting data to an evolved Node-B (eNB) on an uplink (UL) resource; and receiving an acknowledgement (ACK) or negative acknowledgment (NACK) on a physical HARQ-ACK indicator channel (PHICH), responsive to transmitting the data on the UL resource. The PHICH may be mapped to a least physical resource block (PRB) that is offset by a PHICH offset. The PHICH offset may include a group offset and a sequence offset relative to a transport block (TB) index
(Continued)

and first PRB index of a corresponding uplink shared channel. Other embodiments are described.

16 Claims, 6 Drawing Sheets

(51) Int. Cl.
*H04L 5/00* (2006.01)
*H04B 7/0417* (2017.01)

(52) U.S. Cl.
CPC .............. *H04L 1/18* (2013.01); *H04L 1/1816* (2013.01); *H04L 1/1861* (2013.01); *H04L 5/0055* (2013.01); *H04B 7/0417* (2013.01)

(56) References Cited

U.S. PATENT DOCUMENTS

| | | |
|---|---|---|
| 2011/0170499 A1 | 7/2011 | Nayeb et al. |
| 2012/0250663 A1 | 10/2012 | Han et al. |
| 2013/0064200 A1 | 3/2013 | Takeda et al. |
| 2013/0183987 A1 | 7/2013 | Vrzic et al. |
| 2015/0009911 A1 | 1/2015 | Li et al. |
| 2015/0055597 A1 | 2/2015 | Han et al. |

OTHER PUBLICATIONS

"International Application Serial No. PCT/US2015/065522, Written Opinion dated Apr. 29, 2016", 8 pgs.
"European Application Serial No. 15895846.2, Extended European Search Report dated Jan. 24, 2019", 10 pgs.

* cited by examiner

UPLINK RESOURCE COLLISION REDUCTION IN FD-MIMO

CLAIM OF PRIORITY

This patent application is a U.S. National Stage Filing under 35 U.S.C. 371 from International Application No. PCT/US2015/065522, filed on Dec. 14, 2015, and published as WO2016/204807 on Dec. 29, 2016, which claims the benefit of U.S. Provisional Patent Application No. 62/181,652, filed Jun. 18, 2015, entitled "SYSTEM AND METHOD FOR UPLINK ACK/NACK RESOURCE COLLISION REDUCTION IN FD-MIMO SYSTEM", each of which are incorporated by reference herein in their entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of embodiments is not limited in this respect. Some embodiments pertain to 5G communications. Some embodiments relate to full-dimension multi-input multi-output (FD MIMO) systems. Some embodiments relate to collision reduction in FD MIMO systems.

BACKGROUND

Base stations may employ multiple-input multiple-output (MIMO) antenna arrays in order to improve reception performance when communicating with mobile devices. A MIMO antenna array may include a large number of antenna elements in some cases, which may be beneficial in terms of diversity gain or the ability to receive signals from multiple mobile devices in common time and frequency resources. However, resource collisions are more likely as greater numbers of antennas are used. Accordingly, there is a general need to alleviate collision issues in MIMO systems.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
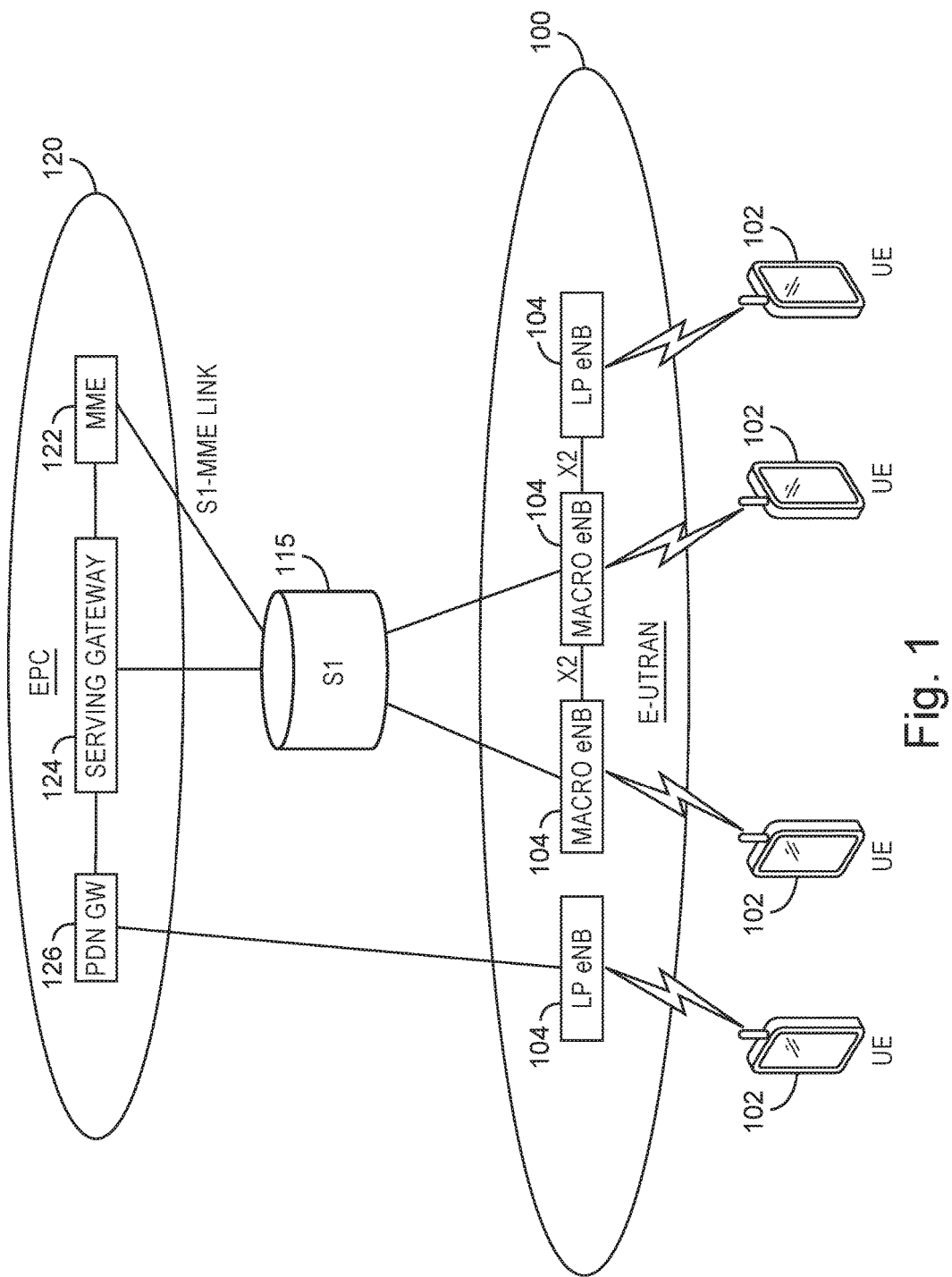
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which can operate as base stations) for communicating with User Equipment (UE) 102. The eNBs 104 can include macro eNBs and low power (LP) eNBs. In accordance with some embodiments, the eNB 104 can receive uplink data packets from the UE 102 on a Radio Resource Control (RRC) connection between the eNB 104 and the UE 102. The eNB 104 can transmit an RRC connection release message to the UE 102 to indicate a transition of the UE 102 to an RRC idle mode for the RRC connection. The eNB 104 can further receive additional uplink data packets according to the stored context information.

The MME 122 manages mobility aspects in access such as gateway selection and tracking area list management. The serving GW 124 terminates the interface toward the RAN 10, and routes data packets between the RAN 100 and the core network 120. In addition, it can be a local mobility anchor point for inter-eNB handovers and also can provide an anchor for inter-3GPP mobility. Other responsibilities may include lawful intercept, charging, and some policy enforcement. The serving GW 124 and the MME 122 can be implemented in one physical node or separate physical nodes. The PDN GW 126 terminates an SGi interface toward the packet data network (PDN). The PDN GW 126 routes data packets between the EPC 120 and the external PDN, and can be a key node for policy enforcement and charging data collection. It can also provide an anchor point for mobility with non-LTE accesses. The external PDN can be any kind of IP network, as well as an IP Multimedia Subsystem (IMS) domain. The PDN GW 126 and the serving GW 124 can be implemented in one physical node or separated physical nodes. Furthermore, the MME 122 and the Serving GW 124 can be collapsed into one physical node in which case the messages will need to be transferred with one less hop.

The eNBs 104 (macro and micro) terminate the air interface protocol and can be the first point of contact for a UE 102. In some embodiments, an eNB 104 can fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 can be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals can comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB can be implemented with a picocell eNB since it is coupled to a macro eNB via an X2 interface. Picocell eNBs or other LP eNBs can incorporate some or all functionality of a macro eNB. In some cases, this can be referred to as an access point base station or enterprise femtocell.

In some embodiments, the eNB 104 may be configured with a two-dimensional active antenna grid such as in an FD-MIMO system, in which antenna elements are placed in the vertical and horizontal direction, although the scope of the embodiments is not limited in this respect. Eight or more antennas, and 64 or more antenna ports, maybe used.

Figure 2:
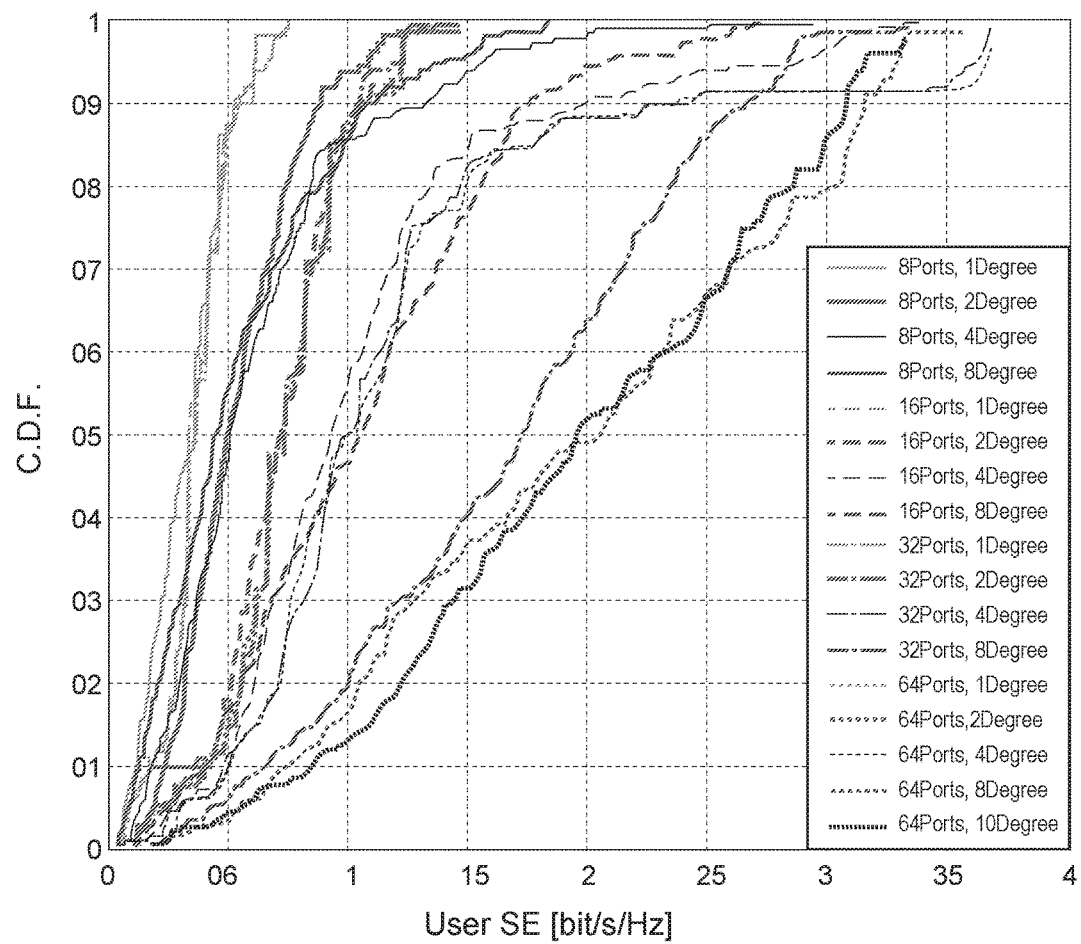
FIG. 2 illustrates a simulation of a user spectrum efficiency distribution in an MU-MIMO system in accordance with some embodiments.

FIG. 2 illustrates a simulation of a user spectrum efficiency (SE) distribution in an FD-MIMO system in accordance with some embodiments. As can be seen upon inspection of FIG. 2, performance is enhanced when a greater number of antenna ports are used, and the MU-MIMO degree is increased.

Figure 3:
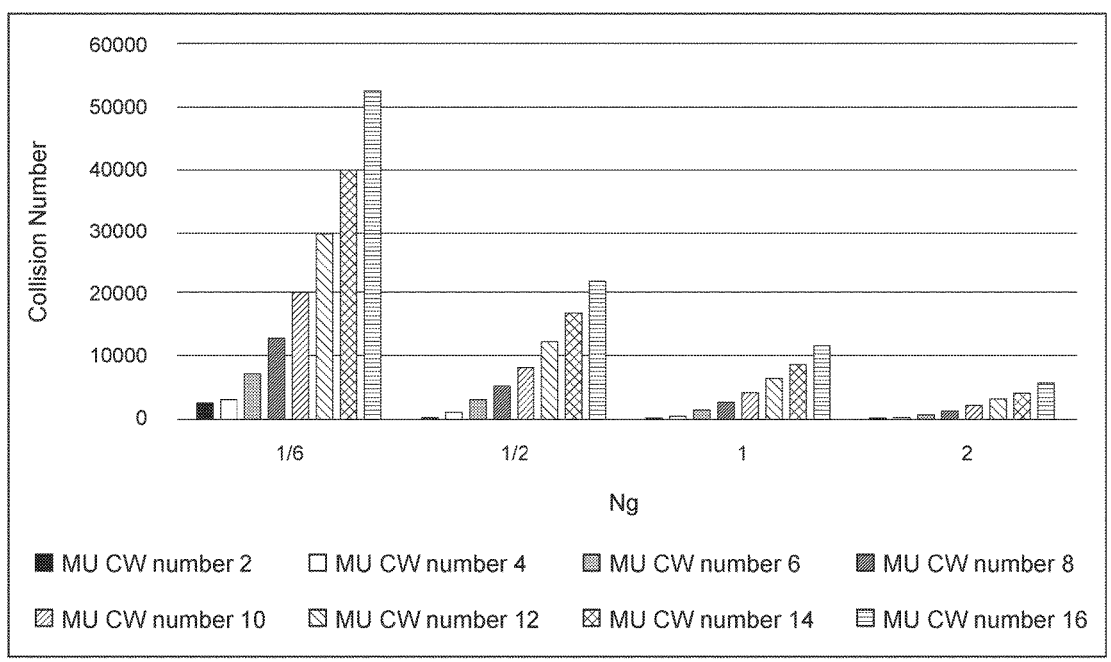
FIG. 3 illustrates the maximum Physical Hybrid-ARQ Indicator Channel (PHICH) resource collision number for varying MU-MIMO degrees in a MU-MIMO system in accordance with some embodiments.

However, resource collisions are more likely with increasing MU-MIMO degree. In particular, Physical Hybrid-ARQ Indicator Channel (PHICH) resource collisions may increase as higher MU-MIMO degrees are used. FIG. 3 illustrates the maximum PHICH resource collision numbers for varying MU-MIMO degrees in a 20 MHz system with one hundred physical resource blocks (PRBs). The value $N_g$ is a parameter used for deriving the number of PHICH groups supported in a system, and is provided in the Master Information Block (MIB) in accordance with standards of the 3GPP family of standards, wherein $N_g \in \{1/6, 1/2, 1, 2\}$. As can be appreciated upon inspection of FIG. 3, PHICH maximum collision numbers increase as the MU-MIMO degree increases.

Embodiments provide a PHICH resource mapping, in which PHICH resources are mapped such that the number (and therefore the probability) of PHICH resource collisions can be reduced.

PHICH Resource Mapping

A PHICH resource is indicated by $(n_{PHICH}^{group}, n_{PHICH}^{seq})$ where $n_{PHICH}^{ggroup}$ is the group index and $n_{PHICH}^{seq}$ is the sequence index of the PHICH resource. One acknowledgement/negative acknowledgement (ACK/NACK) bit is transmitted in one $(n_{PHICH}^{group}, n_{PHICH}^{seq})$ resource, which can be calculated according to equations (1) and (2), below:

$$n_{PHICH}^{group} = (I_{PRB\_RA} + n_{DMRS}) \bmod N_{PHICH}^{group} + I_{PHICH} N_{PHICH}^{group} \quad (1)$$

$$n_{PHICH}^{sequence} = (\lfloor I_{PRB\_RA}/N_{PHICH}^{group} \rfloor + n_{DMRS}) \bmod 2N_{SF}^{PHICH} \quad (2)$$

where $I_{PRB\_RA}$ is defined by the Transport Block (TB) index and the first PRB index for the corresponding physical uplink shared channel (PUSCH). $n_{DMRS}$ is the cyclic shift and OCC index specified in downlink control information (DCI); $N_{SF}^{PHICH}$ is the spreading factor size used for modulation; and $I_{PHICH}$ is 1 at subframe 4 or 9 for time division duplexed (TDD) uplink/downlink configuration 0, and is 0 otherwise.

$N_{PHICH}^{group}$ is the total number of PHICH groups, obtained according to Equation (3) for normal cyclic prefix:

$$N_{PHICH}^{group} = \lceil N_g(N_{RB}^{DL}/8) \rceil \quad (3)$$

Collisions may occur when at least two UEs 102 are allocated to receive ACK/NACK same group index $n_{PHICH}^{ggroup}$ and the same sequence index $n_{PHICH}^{seq}$.

Proposed PHICH Resource Mapping

Embodiments provide alternative PHICH mappings to reduce or eliminate PHICH resource collisions. In some embodiments, a PHICH resource offset is added in the resource mapping. In at least these embodiments, the PHICH mapping may be according to Equations (4)-(5):

$$n_{PHICH}^{group} = (I_{PRB\_RA} + n_{DMRS} + \Delta_g) \bmod N_{PHICH}^{group} + I_{PHICH} N_{PHICH}^{group} \quad (4)$$

$$n_{PHICH}^{sequence} = (\lfloor I_{PRB\_RA}/N_{PHICH}^{group} \rfloor + n_{DMRS} + \Delta_s) \bmod 2N_{SF}^{PHICH} \quad (5)$$

where $\Delta_g$ is an additive component that represents the group offset and $\Delta_s$ is an additive component that represents the sequence offset.

The eNB 104 may transmit the PHICH resource offset in the uplink grant. Example values for $(\Delta_g, \Delta_s)$ given by a two-bit PHICH resource offset are shown in Table 1. It will be appreciated that the PHICH resource offset is not limited to being provided in a two-bit value, that any number of bits can be used.

TABLE 1

Example of PHICH resource offset value mapping.

| PHICH Resource Offset | Group Offset $\Delta_g$ | Sequence Offset $\Delta_s$ |
| --- | --- | --- |
| 0 | 0 | 0 |
| 1 | 1 | 0 |
| 2 | 0 | 1 |
| 3 | 1 | 1 |

In the event that all of the candidate resources have a high possibility of having a PHICH collision, the eNB 104 may select a resource for which the collision UEs 102 have the same block error ratio (BLER), such that those UEs 102 are likely to have the same ACK/NACK status. For example, the eNB 104 may select the resource in which two UEs 102 have similar scheduling times, so that these two UEs 102 have the same outer-loop channel quality indication (CQI) compensation accuracy. In another example, the eNB 104 may select the resource in which two UEs 102 have the same or similar uplink signal to noise ratio (SINR).

In some embodiments, a PHICH resource offset is included as a multiplicative factor (rather than as an additive offset) in the resource mapping. In at least these embodiments, the PHICH mapping may be according to Equations (6)-(7):

$$n_{PHICH}^{group} = (I_{PRB\_RA} + c_0 \cdot n_{DMRS}) \bmod N_{PHICH}^{group} + I_{PHICH} N_{PHICH}^{group} \quad (6)$$

$$n_{PHICH}^{sequence} = (\lfloor I_{PRB\_RA}/N_{PHICH}^{group} \rfloor + c_1 \cdot n_{DMRS}) \bmod 2N_{SF}^{PHICH} \quad (7)$$

where $c_0$ and $c_1$ are constants that can be given by specification (e.g., by a technical specification (TS) of the 3GPP family of specifications) or configured by higher layers via MIB or SIB or dedicated RRC signaling, or configured in any other manner similarly to those for $\Delta_g$ and $\Delta_s$ as described earlier herein. In one example, $c_0=c_1$. In some examples, $c_0=c_1=1$ for backward compatibility.

In some embodiments, Equations (4)-(7) can be combined according to Equations (8)-(9):

$$n_{PHICH}^{group} = (I_{PRB\_RA} + c_0 \cdot n_{DMRS} + \Delta_g) \bmod N_{PHICH}^{group} + I_{PHICH} N_{PHICH}^{group} \quad (8)$$

$$n_{PHICH}^{sequence} = (\lfloor I_{PRB\_RA}/N_{PHICH}^{group} \rfloor + c_1 \cdot n_{DMRS} + \Delta_s) \bmod 2N_{SF}^{PHICH} \quad (9)$$

In some embodiments, a UE-specific PHICH resource index can be configured by higher layers. For example, ($n_{PHICH}^{group}$, $n_{PHICH}^{seq}$) can be configured by UE-specific RRC signaling.

In some embodiments, a PHICH time offset can be used to indicate that PHICH transmission will delay k subframes. The value k can be fixed or configured by RRC signaling. For example, k may be fixed to a value (e.g., 8) for FDD systems, whereas in TDD systems k can be based on the UL/DL configuration to ensure that currently PHICH subframes and delayed subframes are in the same HARQ process round trip.

The PHICH time offset may be transmitted in the uplink grant by providing a trigger. For example, a trigger can include a 1-bit value, wherein 0 signifies no offset and 1 signifies that the PHICH for the current uplink transmission will take place with k subframe delay. The time offset trigger may be transmitted via RRC signaling. Embodiments are not limited to any particular length of the trigger.

In some embodiments, an implicit ACK/NACK feedback may be used, in which the UE 102 retransmits data only when an uplink grant indicating retransmission is received. If the UE 102 does not receive such an uplink grant at the PHICH subframe, the UE 102 considers the previously-transmitted PUSCH as having been correctly decoded. In at least these embodiments, the UE 102 is considered to be operating in a non-adaptive HARQ mode. In some embodiments, the uplink grant can include a mode-switch indicator (e.g., a 1-bit flag) wherein a first value (e.g., 0) indicates that non-adaptive HARQ mode is not used and a second value (e.g., 1) indicates that non-adaptive HARQ mode is to be used for PUSCH in the corresponding subframe. In some embodiments HARQ mode selection may be configured via RRC signaling or implicitly according to uplink MCS, where higher MCS users may be working in the non-adaptive HARQ mode and lower MCS users may be working in normal mode. The MCS threshold may be configured by RRC signaling.

In some embodiments, a control channel element (e.g., enhanced control channel element eCCE, or legacy control channel element CCE, etc.) resource may be used to transmit PHICH. In at least these embodiments, the PHICH may be referred to as an enhanced PHICH (ePHICH). A UE 102 can be configured in PHICH mode or in ePHICH mode, according to configuration provided in RRC signaling. The number of resources provided for ePHICH can be increased to reduce collision likelihood in at least these embodiments. In some embodiments, the uplink grant can include a mode-switch indicator (e.g., a 1-bit flag) wherein a first value (e.g., 1) indicates that ePHICH mode is used. Accordingly, when collisions are detected, the eNB 104 can assign one UE 102 to ePHICH mode and leave other UEs 102 in legacy PHICH mode.

In some embodiments, ACK/NACK feedback can be transmitted in the DCI format in a group manner. Similarly to DCI format 3/3A, an eNB 104 can signal a list of UE identifiers (e.g. cell radio network temporary identifiers (C-RNTI)) in an order to a group of UEs 102. In addition, a common RNTI can be predefined or provided by higher layers for the scrambling of control channels (e.g., PDCCH or ePDCCH, etc.). After successful decoding of the control channel, the UE 102 can derive the intended ACK/NACK according to the order of C-RNTI. The size of the proposed DCI format may coincided with current DCI formats to reduce complexity for blind decoding and power consumption.

Apparatuses for Performing Various Embodiments

Figure 4:
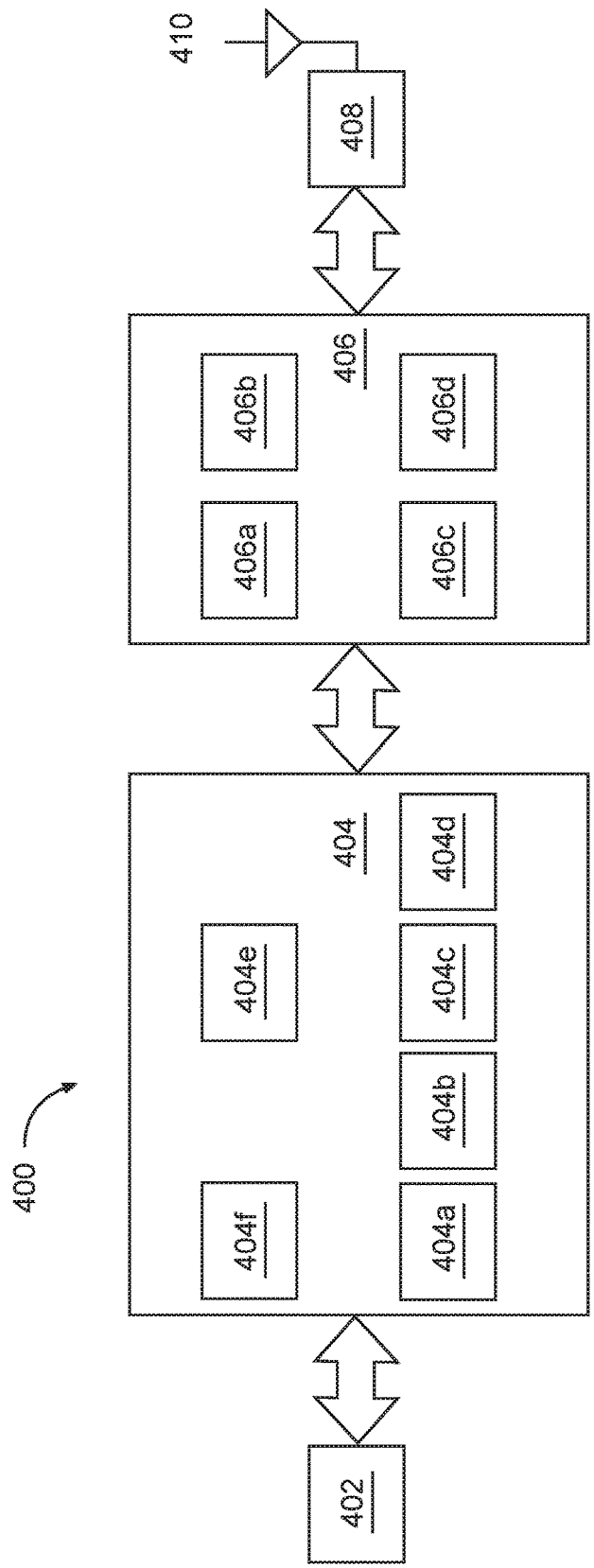
FIG. 4 is a functional diagram of a User Equipment (UE) in accordance with some embodiments.

FIG. 4 is a functional diagram of a User Equipment (UE) 400 in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, "transceiver circuitry" may include one or more elements and/or components, some or all of which may be included in the RF circuitry 406 and/or the FEM circuitry 408. These examples are not limiting, however, as the processing circuitry and/or the transceiver circuitry may also include other elements and/or components in some cases.

In embodiments, the processing circuitry can configure the transceiver circuitry to transmit data to an eNB on an uplink (UL) resource (e.g., eNB 104, FIG. 1).

The processing circuitry can configure the transceiver circuitry to receive an ACK/NACK on a PHICH, responsive to transmitting the data on the UL resource. As described above with reference to at least Equations (4)-(9) the PHICH may be mapped to a PRB that is offset by a PHICH offset, wherein the PHICH offset includes a group offset and a sequence offset relative to a TB index and first PRB index of a corresponding uplink shared channel. A value for the PHICH offset can be received in an UL grant, in RRC signaling, or according to any other method or signaling described earlier herein. As described above with reference to Equations (4)-(5), the PHICH offset can be an additive value equal to 0 or 1, and conveyed by a two-bit value, although embodiments are not limited to any particular size or significance of the values indicating PHICH offset. In some embodiments, at least the group offset (and/or the sequence offset), can be a constant multiplicative factor multiplied by an Orthogonal Cover Code (OCC) provided in downlink control information (DCI). The group offset (and/or the sequence offset) can be received in a SIB on a physical downlink shared channel (PDSCH), or in a MIB on a PBCH, although embodiments are not limited thereto. As described above with reference to Equations (8)-(9), the group offset, the sequence offset, or both the group offset and sequence offset, can include both additive and multiplicative factors.

In addition or instead of usage of PHICH offsets, PHICH can be received by the UE 400 with PHICH time offsets, according to implicit ACK/NACK feedback mechanisms, or in eCCE or DCI formats according to any of the methodologies described earlier herein.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband circuity 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage-controlled oscillator (VCO), although that is not a requirement. Divider control input may be provided by either the baseband circuitry 404 or the application circuitry 402 depending on the desired output frequency. In some embodiments, a divider control input (e.g., N) may be determined from a look-up table based on a channel indicated by the application circuitry 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

Figure 5:
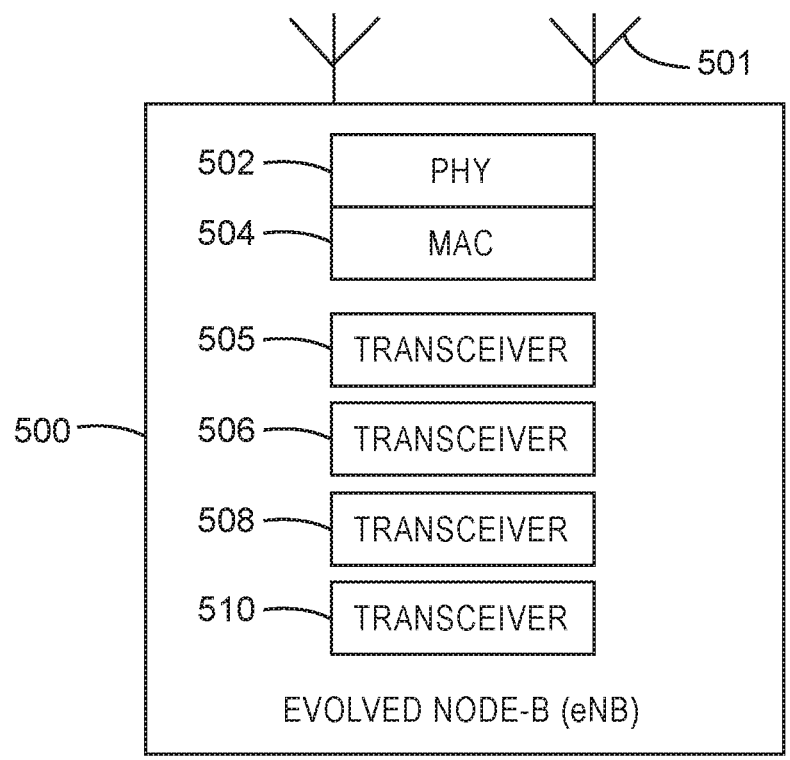
FIG. 5 is a functional diagram of an Evolved Node-B (eNB) in accordance with some embodiments.

FIG. 5 is a functional diagram of an Evolved Node-B (eNB) 500 in accordance with some embodiments. It should be noted that in some embodiments, the eNB 500 may be a stationary non-mobile device. The eNB 500 may be suitable for use as an eNB 104 as depicted in FIG. 1. The eNB 500 may include physical layer circuitry 502 and a transceiver 505, one or both of which may enable transmission and reception of signals to and from the UE 400, other eNBs, other UEs or other devices using one or more antennas 501. As an example, the physical layer circuitry 502 may perform various encoding and decoding functions that may include formation of baseband signals for transmission and decoding of received signals. As another example, the transceiver 505 may perform various transmission and reception functions such as conversion of signals between a baseband range and a Radio Frequency (RF) range. Accordingly, the physical layer circuitry 502 and the transceiver 505 may be separate components or may be part of a combined component. In addition, some of the functionality described may be performed by a combination that may include one, any or all of the physical layer circuitry 502, the transceiver 505, and other components or layers.

In some embodiments, the transceiver 505 can receive UL data from a plurality of UEs 102. In some embodiments, the transceiver 505 can transmit ACK/NACK of the UL data, to at least one of the plurality of UEs, on PHICH, responsive to receiving the UL data. In embodiments, the PHICH is mapped to a least physical resource block (PRB) that is offset by a PHICH offset. The PHICH offset may be determined by the eNB 500 based on collision conditions in a cell served by the eNB. The PHICH offset can include a group offset and a sequence offset defined relative to a TB index and a first PRB index of a corresponding uplink shared channel.

In embodiments, the eNB 500 can determine a value for the group index for at least two of the plurality of UEs 102 such that the value for the group offset is the same for a set of UEs 102 having a same ACK/NACK status. For example, the eNB 500 can determine a value for the group offset by determining a PRB in which at least two of the plurality of UEs 102 share a same BLER. In some embodiments, the eNB 500 can determine a value for the group offset based on UL SINRs for the UEs 102.

In some embodiments, the PHICH offset is a time-based offset defined in terms of subframes. In some embodiments, the PHICH offset is based on an UL/DL configuration in the cell served by the eNB 500.

The eNB 500 may also include medium access control layer (MAC) circuitry 504 for controlling access to the wireless medium. The antennas 410, 501 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 410, 501 may be effectively separated to take advantage of spatial diversity and the different channel characteristics that may result. In FD MIMO embodiments, a two-dimensional planar antenna array structure may be used, and the antenna elements are placed in the vertical and horizontal direction as described earlier herein.

In some embodiments, the UE 400 or the eNB 500 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 500 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 500 or other device may include one or more of a keyboard, a display, a non-volatile memory port, multiple antennas, a graphics processor, an application processor, speakers, and other mobile device elements. The display may be an LCD screen including a touch screen.

Figure 6:
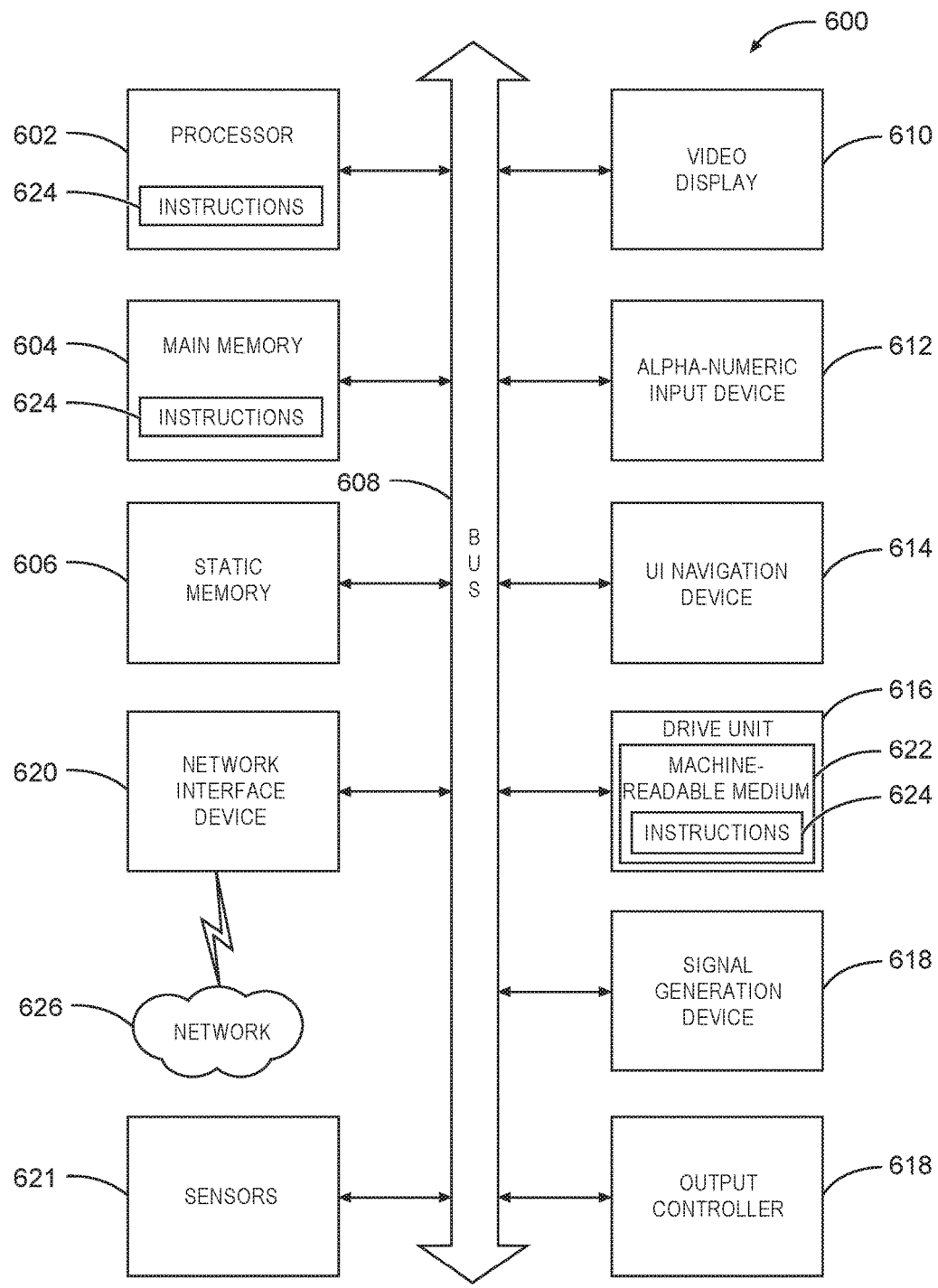
FIG. 6 is a block diagram illustrating components of a machine, according to some example embodiments, able to read instructions from a machine-readable medium and perform any one or more of the methodologies discussed herein, in accordance with some embodiments.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a UE, eNB, MME, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a computer-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a computer-readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 1416 may constitute computer-readable media.

While the computer-readable medium 622 is illustrated as a single medium, the term "computer-readable medium" may include a single medium or multiple media (e.g., a centralized or distributed database, and/or associated caches and servers) configured to store the one or more instructions 624. When the machine 600 operates as a UE, the computer-readable medium 622 can instruct one or more processors of the UE to transmit data to an eNB on a UL resource, and to receive an acknowledgement (ACK) or negative acknowledgment (NACK) on a physical HARQ-ACK indicator channel (PHICH), responsive to transmitting the data on the UL resource, the PHICH being mapped to a physical resource block (PRB) that is offset by a PHICH offset, wherein the PHICH offset includes a group offset and a sequence offset relative to a transport block (TB) index and first PRB index of a corresponding uplink shared channel.

When the machine 600 operates as an eNB, the computer-readable medium 622 can instruct one or more processors of the eNB to receive UL data from a plurality of UEs; to determine scheduling times for the plurality of UEs based on the uplink data, and to transmit ACK/NACK of the uplink data, to at least one of the plurality of UEs, on a PHICH, responsive to receiving the UL data. The PHICH may be mapped to a PRB that is offset by a PHICH offset that avoids collision, based on the scheduling times of the plurality of UEs.

The term "computer-readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting computer-readable medium examples may include solid-state memories, and optical and magnetic media. Specific examples of computer-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, computer-readable media may include non-transitory computer-readable media. In some examples, computer-readable media may include computer-readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), MIMO, FD-MIMO, or multiple-input single-output (MISO) techniques. In some examples, the network interface device 620 may wirelessly communicate using FD-MIMO techniques. The term "transmission medium" shall be taken to include any intangible medium that is capable of storing, encoding or carrying instructions for execution by the machine 600, and includes digital or analog communications signals or other intangible medium to facilitate communication of such software.

To better illustrate the apparatuses, systems, and methods disclosed herein, a non-limiting list of examples is provided herein:

In Example 1, an apparatus for a User Equipment (UE) comprises transceiver circuitry and hardware processing circuitry, the hardware processing circuitry to configure the transceiver circuitry to: transmit data to an evolved Node-B (eNB) on an uplink (UL) resource; and receive an acknowledgement (ACK) or negative acknowledgment (NACK) on a physical HARQ-ACK indicator channel (PHICH), responsive to transmitting the data on the UL resource, the PHICH being mapped to a physical resource block (PRB) that is offset by a PHICH offset, wherein the PHICH offset includes a group offset and a sequence offset relative to a transport block (TB) index and first PRB index of a corresponding uplink shared channel.

In Example 2, the subject matter of Example 1 can optionally include wherein a value for the PHICH offset is received in an UL grant.

In Example 3, the subject matter of Example 1 can optionally include wherein a value for the PHICH offset is received in radio resource control (RRC) signaling.

In Example 4, the subject matter of any of Examples 1-3 can optionally include wherein the PHICH offset is an additive value equal to 0 or 1.

In Example 5, the subject matter of Example 4 can optionally include wherein the PHICH offset is conveyed by a two-bit value.

In Example 6, the subject matter of any of Examples 1-3 can optionally include wherein the group offset is a constant multiplicative factor multiplied by an Orthogonal Cover Code (OCC) provided in downlink control information (DCI).

In Example 7, the subject matter of Example 6 can optionally include wherein the group offset is received in a system information block (SIB) on a physical downlink shared channel (PDSCH).

In Example 8, the subject matter of Example 6 can optionally include wherein the group offset is received in a master information block (MIB) on a physical broadcast channel (PBCH).

In Example 9, the subject matter of Example 6 can optionally include wherein the group offset additionally includes an additive component equal to 0 or 1.

Example 10 includes an apparatus for an Evolved Node-B (eNB), the apparatus comprising hardware processing circuitry and transceiver circuitry, the hardware processing circuitry to configure the transceiver circuitry to: receive uplink (UL) data from a plurality of user equipment (UEs); and transmit an acknowledgement (ACK) or negative acknowledgment (NACK) of the uplink data, to at least one of the plurality of UEs, on a physical HARQ-ACK indicator channel (PHICH), responsive to receiving the UL data, the PHICH being mapped to a physical resource block (PRB) that is offset by a PHICH offset based on collision conditions in a cell served by the eNB.

In Example 11, the subject matter of Example 10 can optionally include wherein the PHICH offset includes a group offset and a sequence offset defined relative to a transport block (TB) index and first PRB index of a corresponding uplink shared channel.

In Example 12, the subject matter of Example 11 can optionally include wherein the hardware processing circuitry to further configure the transceiver circuitry to determine a value for the group offset for at least two of the plurality of UEs such that the value for the group offset is the same for a set of UEs having a same ACK/NACK status.

In Example 13, the subject matter of any of Examples 11-12 can optionally include wherein the hardware processing circuitry to further configure the transceiver circuitry to determine a value for the group offset by determining a PRB in which at least two of the plurality of UEs share a same block error ratio (BLER).

In Example 14, the subject matter of Example 10 can optionally include wherein the PHICH offset includes a group offset and a sequence offset and wherein the hardware processing circuitry to further configure the transceiver circuitry to determine a value for the group offset based on UL signal to noise ratios (SINRs) for the plurality of UEs.

In Example 15, the subject matter of any of Examples 10-14 can optionally include wherein the PHICH offset is a time-based offset defined in terms of subframes.

In Example 16, the subject matter of Example 15 can optionally include wherein the PHICH offset is based on an uplink/downlink configuration in the cell served by the eNB.

In Example 17, the subject matter of any of Examples 10-16 can optionally include eight or more antennas.

In Example 18, the subject matter of Example 17 can optionally include 2 or more antenna ports.

In Example 19, a computer-readable medium stores instructions for execution by one or more processors to perform operations for communication by an Evolved Node-B (eNB), the operations to configure the one or more processors to: decode uplink (UL) data received from a plurality of user equipment (UEs); and configure an acknowledgement (ACK) or negative acknowledgment (NACK) of the uplink data, for transmission to at least one of the plurality of UEs, on a physical HARQ-ACK indicator channel (PHICH), responsive to receiving the UL data, the PHICH being mapped to a physical resource block (PRB) that is offset by a PHICH offset that avoids collision.

In Example 20, the subject matter of Example 19 can optionally include wherein the PHICH offset includes a group offset and a sequence offset relative to a transport block (TB) index and first PRB index of a corresponding uplink shared channel, and wherein the operations further configure the one or more processors to, determine a value for the group offset for at least two of the plurality of UEs such that the value for the group offset is the same for a set of UEs having a same ACK/NACK status.

In Example 21, the subject matter of Example 19 can optionally include wherein the PHICH offset includes a group offset and a sequence offset relative to a transport block (TB) index and first PRB index of a corresponding uplink shared channel, and wherein the operations further configure the one or more processors to, determine a value for the group offset based on UL signal to noise ratios (SINRs) for the plurality of UEs.

In Example 22, the subject matter of Example 19 can optionally include wherein the PHICH offset is a time-based offset defined in terms of subframes, and wherein the PHICH offset is based on an uplink/downlink configuration in a cell served by the eNB.

In Example 23, the subject matter of any Examples 19-22 can optionally include wherein the operations further configure the one or more processors to determine scheduling times for the plurality of UEs based on the uplink data; and wherein the PHICH mapping is based on the scheduling times of the plurality of UEs.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

What is claimed is:

1. An apparatus for a User Equipment (UE), the apparatus comprising transceiver circuitry and hardware processing circuitry, the hardware processing circuitry to configure the transceiver circuitry to:

transmit data to an evolved Node-B (eNB) on an uplink (UL) resource; and receive an acknowledgement (ACK) or negative acknowledgment (NACK) on a physical HARQ-ACK indicator channel (PHICH), responsive to transmitting the data on the UL resource, the PHICH being mapped to a physical resource block (PRB) that is offset by a PHICH offset, wherein the PHICH offset includes a group offset and a sequence offset relative to a transport block (TB) index and first PRB index of a corresponding uplink shared channel, wherein a value for the PHICH offset is received in radio resource control (RRC) signaling, and wherein the value of the PHICH offset includes an additive value equal to 0 or 1 which is conveyed by a two-bit value.

2. An apparatus for a User Equipment (UE), the apparatus comprising transceiver circuitry and hardware processing circuitry, the hardware processing circuitry to configure the transceiver circuitry to:

transmit data to an evolved Node-B (eNB) on an uplink (UL) resource; and receive an acknowledgement (ACK) or negative acknowledgment (NACK) on a physical HARQ-ACK indicator channel (PHICH), responsive to transmitting the data on the UL resource, the PHICH being mapped to a physical resource block (PRB) that is offset by a PHICH offset, wherein the PHICH offset includes a group offset and a sequence offset relative to a transport block (TB) index and first PRB index of a corresponding uplink shared channel; and wherein the group offset is a constant multiplicative factor multiplied by an Orthogonal Cover Code (OCC) provided in downlink control information (DCI).

3. The apparatus of claim 2, wherein the group offset is received in a system information block (SIB) on a physical downlink shared channel (PDSCH).

4. The apparatus of claim 2, wherein the group offset is received in a master information block (MIB) on a physical broadcast channel (PBCH).

5. The apparatus of claim 2, wherein the group offset additionally includes an additive component equal to 0 or 1.

6. An apparatus for an Evolved Node-B (eNB), the apparatus comprising hardware processing circuitry and transceiver circuitry, the hardware processing circuitry to configure the transceiver circuitry to:

receive uplink (UL) data from a plurality of user equipment (UEs); and transmit an acknowledgement (ACK) or negative acknowledgment (NACK) of the uplink data, to at least one of the plurality of UEs, on a physical HARQ-ACK indicator channel (PHICH), responsive to receiving the UL data, the PHICH being mapped to a physical resource block (PRB) that is offset by a PHICH offset based on collision conditions in a cell served by the eNB, wherein:

the PHICH offset includes a group offset and a sequence offset defined relative to a transport block (TB) index and first PRB index of a corresponding uplink shared channel; and the hardware processing circuitry includes circuitry to further configure the transceiver circuitry to determine a value for the group offset for at least two of the plurality of UEs such that the value for the group offset is the same for a set of UEs having a same ACK/NACK status.

7. The apparatus of claim 6 wherein the hardware processing circuitry to further configure the transceiver circuitry to:

determine a value for the group offset by determining a PRB in which at least two of the plurality of UEs share a same block error ratio (BLER).

8. The apparatus of claim 6, further including eight or more antennas.

9. The apparatus of claim 8, further including 2 or more antenna ports.

10. An apparatus for an Evolved Node-B (eNB), the apparatus comprising hardware processing circuitry and transceiver circuitry, the hardware processing circuitry to configure the transceiver circuitry to:

receive uplink (UL) data from a plurality of user equipment (UEs); and transmit an acknowledgement (ACK) or negative acknowledgment (NACK) of the uplink data, to at least one of the plurality of UEs, on a physical HARQ-ACK indicator channel (PHICH), responsive to receiving the UL data, the PHICH being mapped to a physical resource block (PRB) that is offset by a PHICH offset based on collision conditions in a cell served by the eNB, wherein the PHICH offset includes a group offset and a sequence offset and wherein the hardware processing circuitry includes circuitry to further configure the transceiver circuitry to determine a value for the group offset based on UL signal to noise ratios (SINRs) for the plurality of UEs.

11. An apparatus for an Evolved Node-B (eNB), the apparatus comprising hardware processing circuitry and transceiver circuitry, the hardware processing circuitry to configure the transceiver circuitry to:

receive uplink (UL) data from a plurality of user equipment (UEs); and transmit an acknowledgement (ACK) or negative acknowledgment (NACK) of the uplink data, to at least one of the plurality of UEs, on a physical HARQ-ACK indicator channel (PHICH), responsive to receiving the UL data, the PHICH being mapped to a physical resource block (PRB) that is offset by a PHICH offset based on collision conditions in a cell served by the eNB, wherein the PHICH offset is a time-based offset defined in terms of subframes, and wherein the PHICH offset is based on an uplink/downlink configuration in the cell served by the eNB.

12. A non-transitory computer-readable medium that stores instructions for execution by one or more processors to perform operations for communication by an Evolved Node-B (eNB), the operations to configure the one or more processors to:

decode uplink (UL) data received from a plurality of user equipment (UEs); and configure an acknowledgement (ACK) or negative acknowledgment (NACK) of the uplink data, for transmission to at least one of the plurality of UEs, on a physical HARQ-ACK indicator channel (PHICH), responsive to receiving the UL data, the PHICH being mapped to a physical resource block (PRB) that is offset by a PHICH offset that avoids collision, wherein a value for the PHICH offset is encoded for transmission via radio resource control (RRC) signaling, and wherein the value of the PHICH offset includes an additive value equal to 0 or 1 which is conveyed by a two-bit value.

13. The non-transitory computer-readable medium of claim 12, wherein the PHICH offset includes a group offset and a sequence offset relative to a transport block (TB) index and first PRB index of a corresponding uplink shared channel, and wherein the operations further configure the one or more processors to, determine a value for the group offset for at least two of the plurality of UEs such that the value for the group offset is the same for a set of UEs having a same ACK/NACK status.

14. The non-transitory computer-readable medium of claim 12, wherein the PHICH offset includes a group offset and a sequence offset relative to a transport block (TB) index and first PRB index of a corresponding uplink shared channel, and wherein the operations further configure the one or more processors to, determine a value for the group offset based on UL signal to noise ratios (SINRs) for the plurality of UEs.

15. The non-transitory computer-readable medium of claim 12, wherein the PHICH offset is a time-based offset defined in terms of subframes, and wherein the PHICH offset is based on an uplink/downlink configuration in a cell served by the eNB.

16. The non-transitory computer-readable medium of claim 12, wherein the operations further configure the one or more processors to determine scheduling times for the plurality of UEs based on the uplink data; and wherein the PHICH mapping is based on the scheduling times of the plurality of UEs.

\* \* \* \* \*